(12) United States Patent
Crummy

(10) Patent No.: US 9,510,580 B2
(45) Date of Patent: Dec. 6, 2016

(54) FISH HANDLING AND WEIGHING SYSTEM

(71) Applicant: Jason S. Crummy, Moorhead, MN (US)

(72) Inventor: Jason S. Crummy, Moorhead, MN (US)

( * ) Notice: Subject to any disclaimer, the term of this patent is extended or adjusted under 35 U.S.C. 154(b) by 0 days.

(21) Appl. No.: 14/681,467

(22) Filed: Apr. 8, 2015

(65) Prior Publication Data

US 2016/0295846 A1 Oct. 13, 2016

(51) Int. Cl.
| | | |
|---|---|---|
| *B65G 7/12* | (2006.01) | |
| *A01K 97/00* | (2006.01) | |
| *B25J 1/04* | (2006.01) | |
| *A01K 97/14* | (2006.01) | |
| *G01B 5/02* | (2006.01) | |

(52) U.S. Cl.
CPC ............... *A01K 97/00* (2013.01); *A01K 97/14* (2013.01); *B25J 1/04* (2013.01); *B65G 7/12* (2013.01); *G01B 5/02* (2013.01)

(58) Field of Classification Search
CPC ........ A01K 97/14; A01K 97/00; B65G 7/12; G01G 3/02; G01G 19/50; G01G 23/01; G01G 23/163; B25J 1/04; G01B 5/02
See application file for complete search history.

(56) References Cited

U.S. PATENT DOCUMENTS

| | | | |
|---|---|---|---|
| 2,446,720 A | 8/1948 | Rominski | |
| 2,598,230 A * | 5/1952 | Dann ..................... | A01K 97/14 294/26 |
| 2,994,622 A | 8/1961 | Miller | |
| 3,311,398 A * | 3/1967 | Erhardt ................ | A01K 97/14 294/175 |
| 3,449,007 A * | 6/1969 | White ..................... | A01K 97/14 294/26 |
| 3,743,042 A | 7/1973 | Hilterhaus | |
| D273,075 S * | 3/1984 | Hayden ........................ | 294/26 |
| 4,590,700 A * | 5/1986 | Klein ..................... | A01K 97/14 43/5 |
| 4,964,479 A * | 10/1990 | Sumida .................. | G01G 23/14 177/165 |
| 5,228,226 A | 7/1993 | Porosky | |
| 6,464,271 B1 * | 10/2002 | Irvin, Jr. ............... | A47J 43/283 294/26 |
| 2008/0083864 A1* | 4/2008 | Davis ...................... | F16B 45/02 248/339 |
| 2009/0038205 A1* | 2/2009 | Stroud ................... | A01K 75/00 43/4.5 |
| 2010/0244474 A1* | 9/2010 | Kornely .................. | F24B 15/10 294/11 |
| 2011/0247260 A1* | 10/2011 | Schwartz ............... | A01K 85/01 43/42.31 |

FOREIGN PATENT DOCUMENTS

WO WO8401488 A1 * 4/1984

* cited by examiner

*Primary Examiner* — Stephen Vu
(74) *Attorney, Agent, or Firm* — Neustel Law Offices; Michael S. Neustel

(57) ABSTRACT

A fish handling and weighing system that generally includes a handle having a lower end and an upper end, length indicia attached to the side of the handle, an upper connector attached to the upper end of the handle for connecting to a scale device, and a hook attached to the lower end of the handle for engaging a fish.

1 Claim, 8 Drawing Sheets

FISH HANDLING AND WEIGHING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a fish handling device and more specifically it relates to a fish handling and weighing system for efficiently handling and weighing fish.

Description of the Related Art

Any discussion of the related art throughout the specification should in no way be considered as an admission that such related art is widely known or forms part of common general knowledge in the field.

Conventional fish handling devices are comprised of nets, fish grabbers with opposing jaws, fish vice grips, fish grippers, lip grippers or hooks. While conventional fish handling devices are suitable for getting a fish out of water, they are not as suitable for handling and weighing the fish.

BRIEF SUMMARY OF THE INVENTION

The invention generally relates to a fish handling device which includes a handle having a lower end and an upper end, length indicia attached to the side of the handle, an upper connector attached to the upper end of the handle for connecting to a scale device, and a hook attached to the lower end of the handle for engaging a fish.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
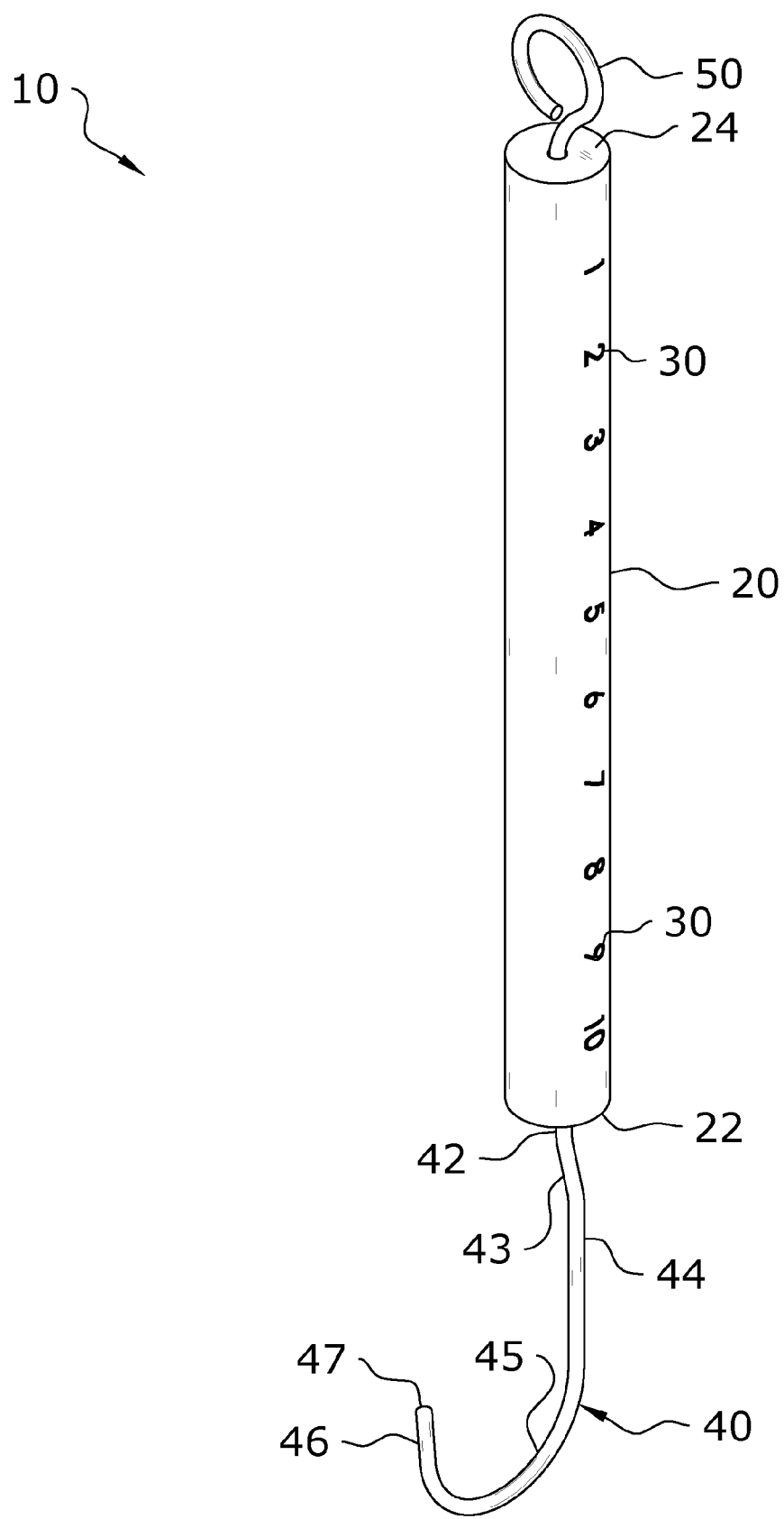
FIG. 1 is an upper front side perspective view of the present invention.
Figure 2:
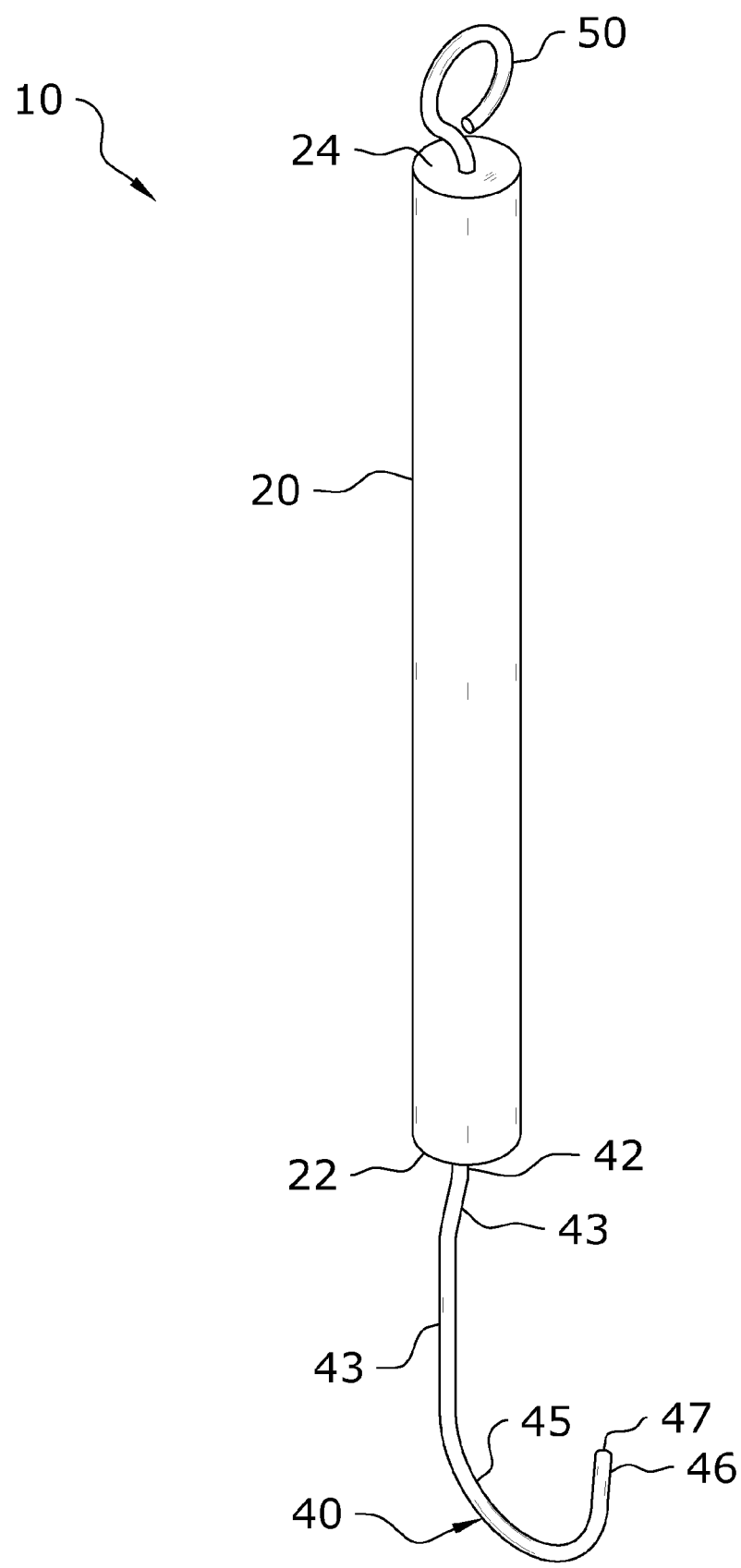
FIG. 2 is an upper rear side perspective view.

Turning now descriptively to the drawings, in which similar reference characters denote similar elements throughout the several views, FIGS. 1 through 9 illustrate a fish handling and weighing system 10, which comprises a handle 20 having a lower end 22 and an upper end 24, length indicia 30 attached to the side of the handle 20, an upper connector 50 attached to the upper end 24 of the handle 20 for connecting to a scale device 12, and a hook 40 attached to the lower end 22 of the handle 20 for engaging a fish 16. The present invention is adapted to handle and weigh various types and sizes of fish 16.

B. Handle

The handle 20 has a lower end 22 and an upper end 24. It should be understood that the terms "upper" and "lower" are the direction the ends of the handle 20 are facing when the handle 20 is vertically orientated as illustrated in FIGS. 1 through 4 and 7 of the drawings.

The handle 20 is comprised of an elongated straight structure. The length of the handle 20 is at least ten inches and is preferably approximately 11 inches in length, but greater or less lengths for the handle 20 may be used. The length from a distal portion of the hook 40 to the upper end 24 of the handle 20 is preferably approximately 16 inches though the length may be greater or less.

Figure 3:
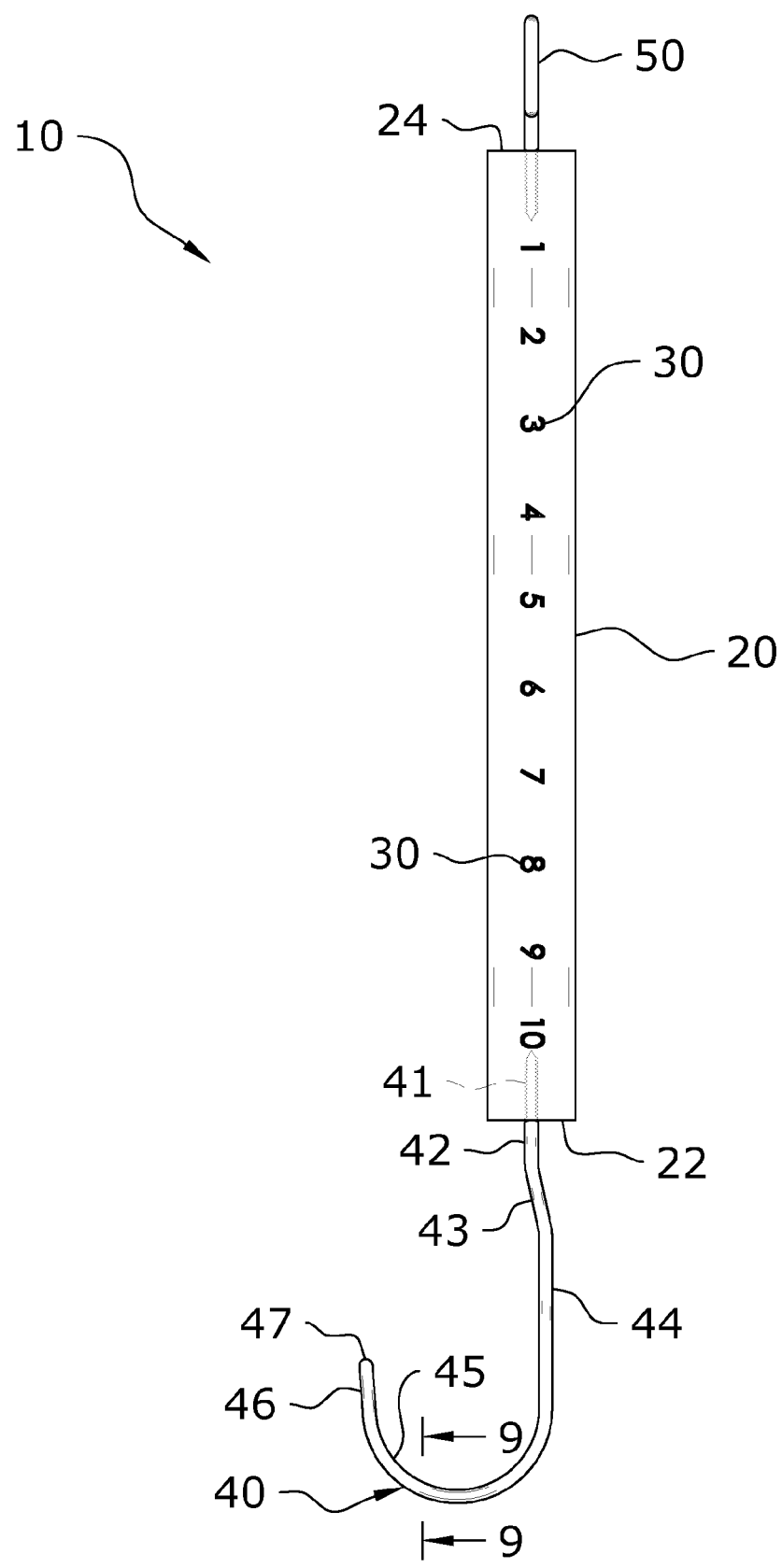
FIG. 3 is a front view of the present invention.
Figure 4:
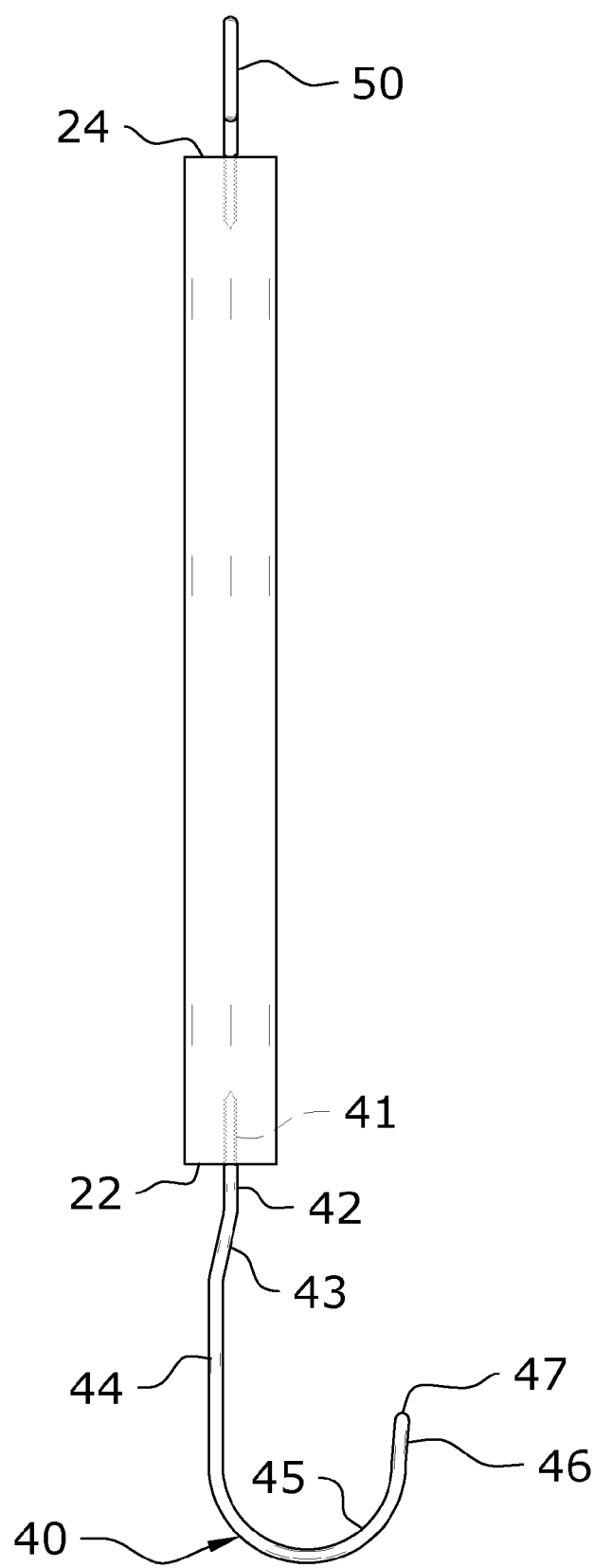
FIG. 4 is a rear view of the present invention.
Figure 5:
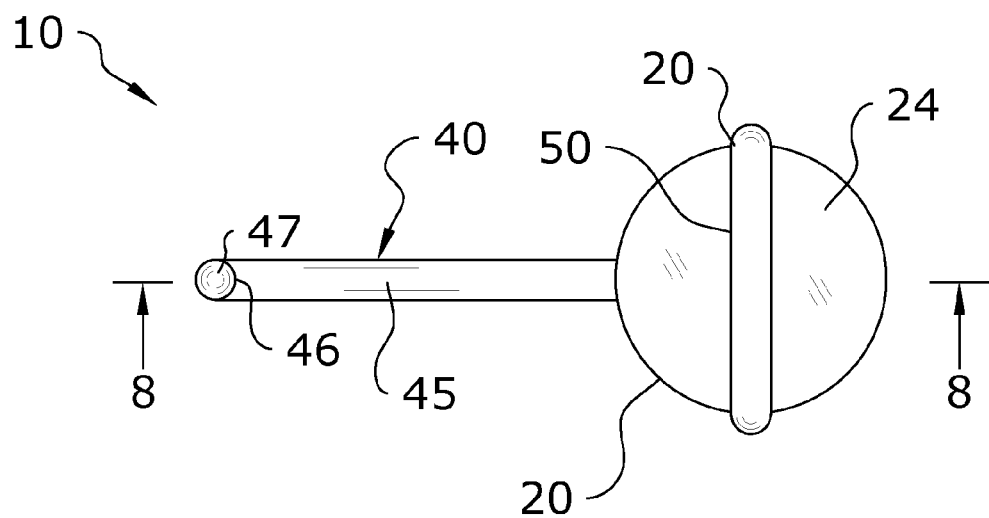
FIG. 5 is a top view of the present invention.
Figure 6:
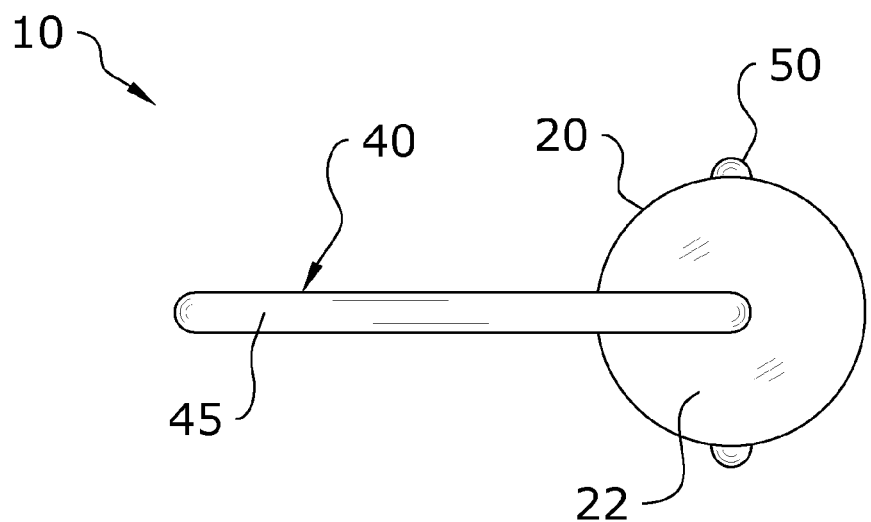
FIG. 6 is a bottom view of the present invention.
Figure 8:
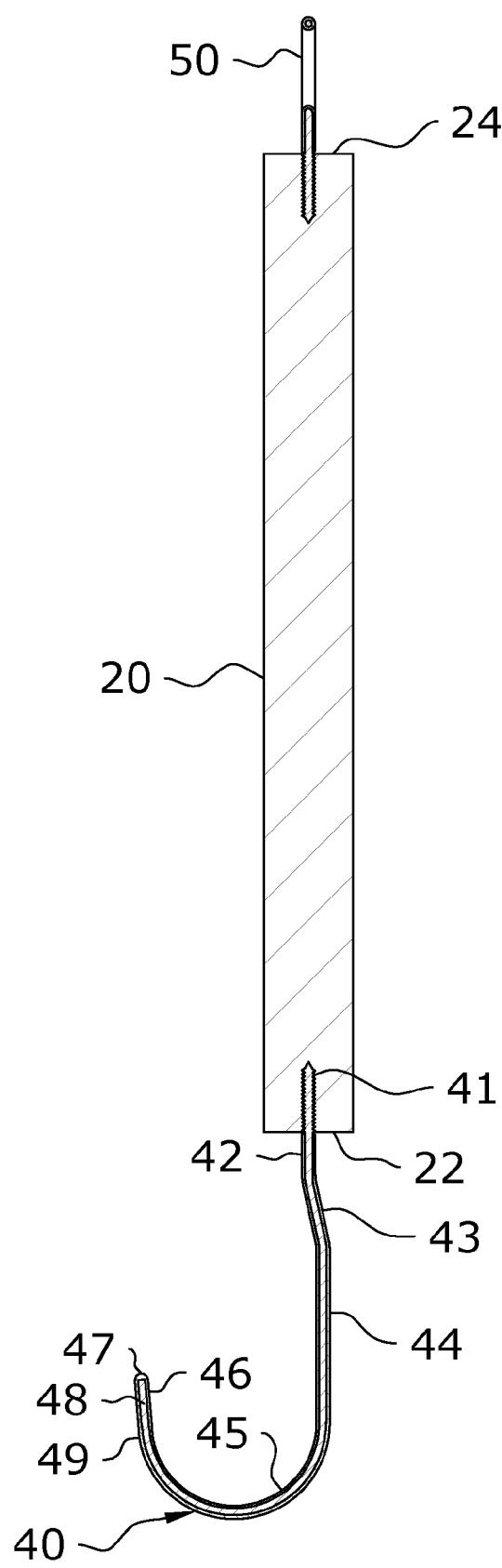
FIG. 8 is a cross sectional view taken along line 8-8 of FIG. 5.
Figure 9:
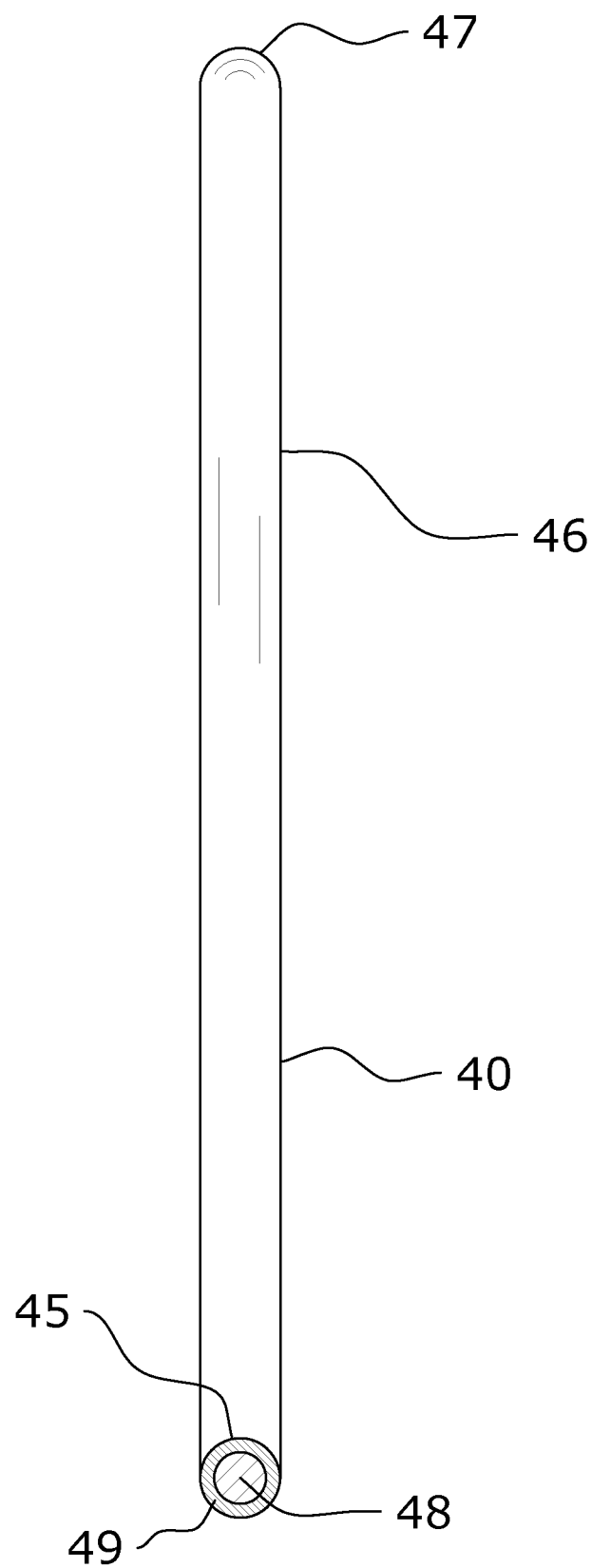
FIG. 9 is a cross sectional view taken along line 9-9 of FIG. 3.

The handle 20 has a width that is significantly greater than the width of the hook 40 as illustrated in FIGS. 3, 4 and 8 of the drawings. The handle 20 preferably has a circular cross sectional shape for ergonomic grasping in the hand by the user. However, the handle 20 may have other types of cross sectional shapes such as, but not limited to, square, rectangular, oval, triangular, polygonal and the like.

Figure 7:
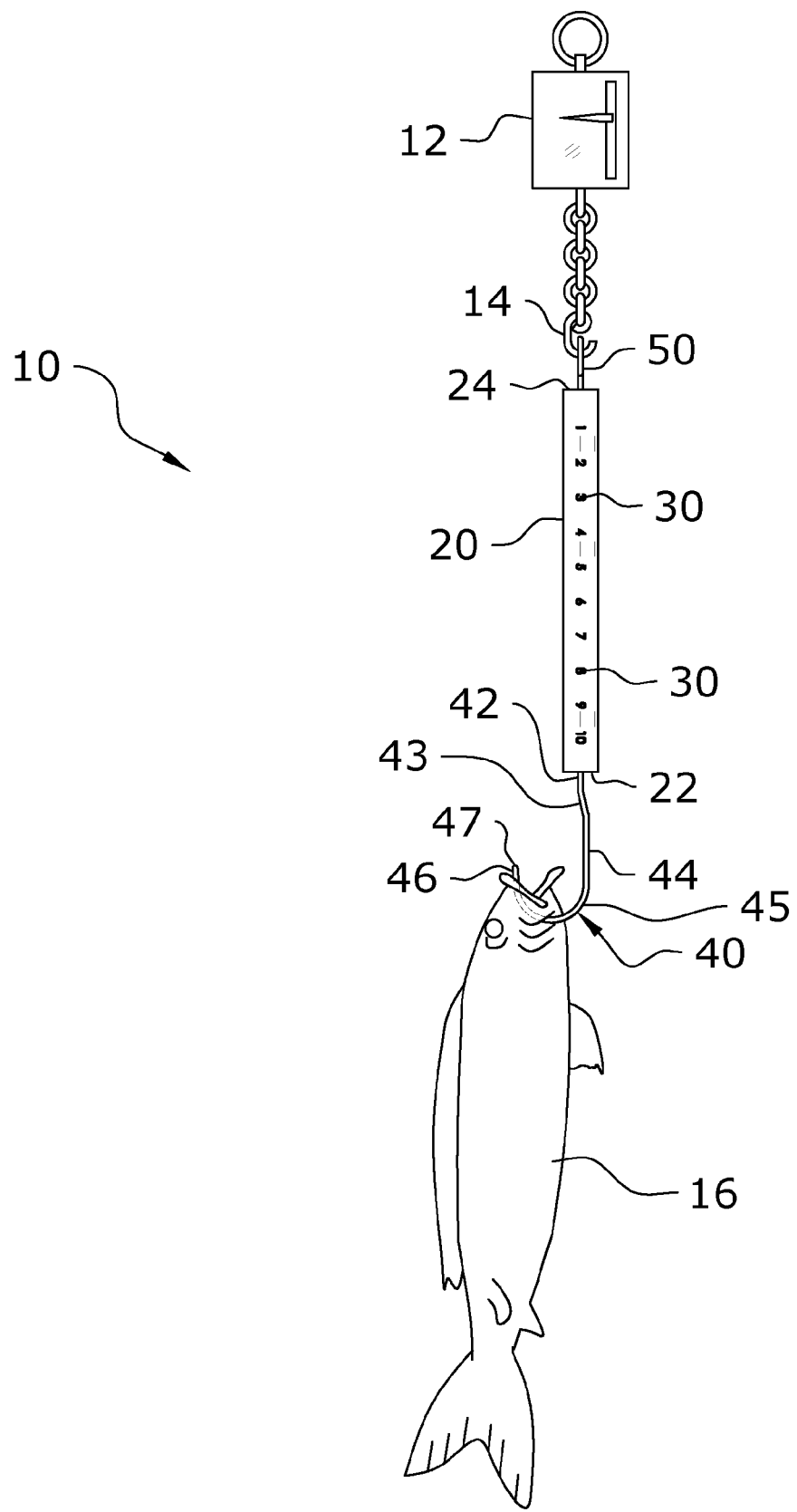
FIG. 7 is a front view of the present invention attached to a scale device and a fish.

A plurality of length indicia 30 are attached to a side of the handle 20 to allow a fisherman to measure the length of a fish 16 as illustrated in FIGS. 1, 3 and 7 of the drawings. The plurality of length indicia 30 are numbers or other types of characters representing a length measurement unit to measure the length of a fish 16. FIGS. 1 and 3 best illustrate the length indicia 30 with each number representing a one inch segment of length.

The handle 20 is preferably comprised of a rigid and buoyant material that is sufficient in volume and buoyancy to maintain at least a portion of the present invention above the surface of water if accidentally dropped into the water by a fisherman. The handle 20 is preferably comprised of a wood material that provides sufficient buoyancy, but the handle 20 may be comprised of other types of buoyant materials or hollow structures within a rigid material that provide buoyancy (e.g. plastic material, a portion of the handle 20 comprised of a tubular plastic material).

C. Upper Connector

The upper connector 50 is attached to the upper end 24 of the handle 20 opposite of the hook 40 as illustrated in FIGS. 1 through 4 of the drawings. The upper connector 50 is comprised of a structure and adapted for connecting to a scale device 12 to weigh a fish 16 attached to the hook 40 at the opposite end of the handle 20 as illustrated in FIG. 7 of the drawings. The upper connector 50 is comprised of an eyelet having an opening that removably receives a scale connector 14 from the scale device 12. The scale device 12 may be comprised of any scale capable of weighing a fish 16 including digital and spring type scales. The upper connector 50 includes a threaded portion that extends into the upper end 24 of the handle 20 and is connected to the eyelet portion of the upper connector 50. Similar to the hook 40, the upper connector 50 may be comprised of a rigid material (e.g. metal) coated by a coating (e.g. powder coating, rubber coating, plastic coating).

D. Hook

The hook 40 is attached to the lower end 22 of the handle 20 opposite of the upper connector 50 for removably engaging and supporting the fish 16 as illustrated in FIG. 7 of the drawings. The hook 40 includes a distal end 47 positioned away from the lower end 22 of the handle 20 that is inserted through the gill plate and out through the mouth of the fish 16 to avoid harming the fish 16 as illustrated in FIG. 7. The distal end 47 of the hook 40 is preferably a blunt structure (e.g. rounded) to avoid injuring the fish 16 when inserting the hook 40 through the gill plate.

The hook 40 is preferably comprised of a rigid portion 48 (e.g. metal material) surrounded by an outer coating 49 (e.g. powder coating, rubber coating, plastic coating). It is preferable that the outer coating 49 is comprised of a powder coating since a rubber coating may be damaged by the teeth of the fish 16.

The hook 40 is comprised a vertical portion extending outwardly away from the lower end 22 of the handle 20 and a curved portion extending away from the vertical portion. The curved portion extends outwardly and away from the side portion of the handle 20 to allow for easy insertion of the hook 40 into the gill plate of the fish 16 as illustrated in FIGS. 1 through 4, 7 and 8 of the drawings. The distal end 47 of the hook 40 is part of the curved portion.

The vertical portion of the hook 40 is comprised of a first segment 41 extending into the lower end 22 of the handle 20. The first segment 41 is preferably threaded to allow for threaded insertion into the lower end 22 of the handle 20 as illustrated in FIG. 8 of the drawings. The first segment 41 is concentrically aligned with the handle 20 and is further preferably concentrically aligned with the vertical portion of the upper connector 50 as illustrated in FIG. 8 of the drawings.

The hook 40 includes a second segment 42 extending downwardly in a vertical manner from the lower end 22 of the handle 20 as shown in FIGS. 1 through 4, 7 and 8 of the drawings. The second segment 42 is preferably concentrically aligned with the first segment 41 and the handle 20 as illustrated in FIG. 8 of the drawings. The second segment 42 extends outwardly a short distance relative to the remaining portion of the hook 40 as further illustrated in FIG. 8 of the drawings.

The hook 40 further includes a third segment 43 extending downwardly from the second segment 42 at an angle that extends away from the longitudinal axis of the handle 20 as best illustrated in FIGS. 3, 4 and 8 of the drawings. The third segment 43 is also a shorter segment intended to position the curved portion of the hook 40 in a more centralized location with respect to the handle 20 to support the fish 16 in a more central manner on the hook 40.

The hook 40 also includes a fourth segment 44 extending downwardly from the third segment 43 in a vertical manner. The fourth segment 44 is preferably parallel with respect to the longitudinal axis of the handle 20 and the longitudinal axis of the first segment 41 and the second segment 42 as illustrated in FIG. 8. The fourth segment 44 is comprised of a longer length than the first segment 41 and the second segment 42 as illustrated in FIG. 8. The fourth segment 44 is preferably at least 2 inches in length.

The hook 40 also includes a fifth segment 45 having a curved configuration extending away from the fourth segment 44 as illustrated in FIGS. 1 through 4, 7 and 8 of the drawings. The fifth segment 45 initially extends downwardly from the fourth segment 44 and then extends horizontally outwardly away from the handle 20 as shown in FIGS. 3 and 4 of the drawings. The fifth segment 45 preferably extends horizontally in a direction opposite of the angle for the third segment 43 as illustrated in FIGS. 3, 4 and 8 of the drawings.

The hook 40 also includes a sixth segment 46 extending upwardly from the fifth segment 45. The sixth segment 46 extends upwardly and outwardly at an angle away from a concentric axis of the handle 20 as best illustrated in FIGS. 3, 4 and 8 of the drawings. The sixth segment 46 includes the distal end 47 wherein the distal end 47 is positioned below the lower end 22 of the handle 20 as best illustrated in FIG. 8 of the drawings. The distal end 47 of the hook 40 is preferably positioned at least 2 inches below the lower end 22 of the handle 20 and is further preferably positioned at least 2 inches horizontally away from the concentric axis of the handle 20.

E. Operation of Preferred Embodiment

In use, the user engages a fish 16 by inserting the distal end 47 of the hook 40 through the gill plate of the fish 16 with the distal end 47 extending upwardly through the mouth of the fish 16 as illustrated in FIG. 7 of the drawings. The user is able to humanely and safely handle the fish 16 without injuring the fish 16 this way. The user then connects a scale device 12 having a scale connector 14 (e.g. a hooked structure) to the handle 20 by removably connecting the scale connector 14 to the upper connector 50 of the handle 20 as further shown in FIG. 7. The user is then able to grasp the scale device 12 to get the entire weight of the fish 16. The user discounts any added weight of the present invention to determine the total weight of the fish 16 being weighed. After the user is finished, the user disconnects the scale device 12 from the upper connector 50 and also removes the hook 40 from the fish 16 to release the fish 16. The above process is repeated for the next fish 16 to be weighed.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A fish handling device, comprising:

a scale device including a hook and a ring opposite of said hook;

a handle having a lower end and an upper end, wherein said handle is comprised of an elongated structure having a length of at least ten inches, and wherein said handle is comprised of a rigid and buoyant material;

a plurality of length indicia attached to a side of said handle, wherein said plurality of length indicia are numbers representing a length measurement unit to measure the length of a fish;

an upper connector attached to said upper end of said handle, wherein said upper connector is comprised of an eyelet, wherein said upper connector includes a threaded portion that extends into said upper end of said handle, and wherein said upper connector is connected to said hook of said scale device; and a hook attached to said lower end of said handle adapted for engaging a fish, wherein said hook includes a distal end positioned away from said lower end of said handle, wherein said distal end of said hook is comprised of a blunt structure, wherein said hook is comprised a vertical portion extending outwardly away from said lower end of said handle and a curved portion extending away from said vertical portion, and wherein said hook is comprised of a rigid portion surrounded by an outer coating;

wherein said vertical portion is comprised of a first segment extending into said lower end of said handle and concentrically aligned with said handle, a second segment extending downwardly in a vertical manner from said lower end of said handle, a third segment extending downwardly from said second segment at an angle, a fourth segment extending downwardly from said third segment in a vertical manner, a fifth segment having a curved configuration extending away from said fourth segment and a sixth segment extending upwardly from said fifth segment.

* * * * *